United States Patent [19]

Bogdan et al.

[11] Patent Number: 5,395,441
[45] Date of Patent: Mar. 7, 1995

[54] REVERT BRIQUETTES FOR IRON MAKING BLAST FURNACE

[75] Inventors: Eugene A. Bogdan, North Huntingdon; Richard L. Cole, Cochranton, both of Pa.

[73] Assignee: USX Corporation, Pittsburgh, Pa.

[21] Appl. No.: 107,270

[22] Filed: Aug. 16, 1993

Related U.S. Application Data

[63] Continuation-in-part of Ser. No. 962,817, Oct. 19, 1992, abandoned.

[51] Int. Cl.$^6$ .......................... C04B 7/14; C04B 18/08
[52] U.S. Cl. ..................... 106/714; 106/716; 106/718; 106/767; 106/DIG. 4
[58] Field of Search ............... 106/714, 716, 718, 767, 106/DIG. 4; C04B 7/14, 18/08

[56] References Cited

U.S. PATENT DOCUMENTS

| | | | |
|---|---|---|---|
| 1,994,378 | 3/1935 | Williams et al. | 75/56 |
| 1,994,379 | 3/1935 | Williams | 75/56 |
| 2,055,706 | 9/1936 | Ramseyer . | |
| 2,516,342 | 7/1950 | Randall et al. . | |
| 2,582,386 | 1/1952 | Komarek et al. | 75/3 |
| 3,197,317 | 7/1965 | Patchen | 106/718 |
| 3,252,788 | 5/1966 | Holik | 75/3 |
| 3,258,327 | 6/1966 | Smoot | 75/3 |
| 3,779,782 | 12/1973 | Erickson et al. . | |
| 4,207,116 | 6/1980 | Been et al. . | |
| 4,235,291 | 11/1990 | Messenger | 106/718 |
| 4,377,416 | 3/1983 | Maul et al. | 106/718 |

FOREIGN PATENT DOCUMENTS 0040860 2/1986 Japan ................... 106/718

*Primary Examiner*—Mark L. Bell
*Assistant Examiner*—Paul Marcantoni
*Attorney, Agent, or Firm*—W. F. Riesmeyer, III

[57] ABSTRACT

An iron making blast furnace revert briquette composition including finishing mill scale, steelmaking slag, blast furnace dust and a binder wherein the binder includes Portland cement, granulated blast furnace slag cement or mixtures thereof and bentonite. The bentonite improves the cold and hot strength of the briquette.

12 Claims, No Drawings

REVERT BRIQUETTES FOR IRON MAKING BLAST FURNACE

This is a continuation-in-part of application Ser. No. 07/962,817, filed Oct. 19, 1992, now abandoned.

FIELD OF THE INVENTION

This invention relates to revert briquettes for use in blast furnaces for the manufacture of iron. The briquettes contain in major proportion by-products of the iron and steel manufacturing process for the purpose of utilizing iron, manganese, and carbon units therefore, reducing waste of such materials and for reducing the need to landfill which results from such waste.

SUMMARY OF THE INVENTION

This invention relates to the use of bentonite as an additive to a cement component, said cement component being selected from the group consisting of Portland cement, granulated blast furnace slag cement and mixtures thereof, to produce a binder for forming a revert agglomerate suitable for recycling through a blast furnace.

The cement/bentonite binder is used in the production of cold-bonded agglomerates including blast-furnace flue dust, steelmaking slag and finishing-mill roll scale. The bentonite in the agglomerate composite is an advantageous substitute for calcium-aluminate refractory cement which was known to improve the high temperature properties of agglomerates. The bentonite-containing composition is of lower cost and further enhances the high-temperature properties of the agglomerates, particularly in regard to the tendency of the revert agglomerates to swell (increase in volume) at high reduction levels (low 0/Fe ratios).

Bentonite is a montmorillonite-clay material. The bentonite is generally 25 to 30 weight percent of the cement/bentonite total binder composition. The binder comprises about 10–15 percent of the total agglomerate composition. Table 1 presents a detailed analysis of a typical fast setting Portland cement or granulated blast furnace slag cement/bentonite binder composition.

TABLE 1

CHEMICAL COMPOSITION OF A BINDER

| Constituent | Port. Cement Type III | Granulated Blast Furnace Slag | Bentonite | 75% Port./ 25% Bent. | 75% B.F. Slag/ 25% Bent. |
| --- | --- | --- | --- | --- | --- |
| Fe Total | 1.96 | — | 3.08 | 2.24 | — |
| $SiO_2$ | 21.54 | 36.8 | 56.46 | 39.27 | 41.7 |
| $Al_2O_3$ | 4.62 | 7.0 | 18.20 | 8.76 | 9.7 |
| CaO | 64.68 | 39.7 | 2.30 | 49.08 | 30.4 |
| MgO | 2.54 | 10.7 | 2.63 | 2.57 | 8.6 |
| $Na_2O$ | 0.10 | — | 2.53 | 0.71 | — |
| $K_2O$ | 0.75 | .4 | 0.55 | 0.70 | 0.5 |
| S | 1.56 | 1.1 | 0.19 | 1.22 | 1.1 |
| Loss on ignition | 2.15 | — | 11.95 | 4.60 | — |

Following is an illustration of the composition range of components present in bentonite.

|  | Composition Range % By Weight |
| --- | --- |
| Fe | 0 to 5 |
| $SiO_2$ | 55 to 60 |
| $Al_2O_3$ | 15 to 20 |
| CaO | 2 to 5 |
| MgO | 0 to 3 |
| $Na_2O$ | 0 to 3 |
| $K_2O$ | 0 to 1 |
| S | 0 to 0.2 |
| Loss on ignition ($H_2O$) | 10 to 12 |

Prior art binders consisting of Portland cement (85 to 90%) enriched with a calcium-aluminate refractory cement (10 to 15%) were considered to have acceptable cold strength but only marginally acceptable high-temperature reduction strength which restricted use of the agglomerate to about 10 percent of the iron-bearing burden when recycling to the blast furnace. The marginally acceptable high-temperature strength is related to a swelling (volume increase) characteristic at high reduction levels where oxygen is removed and iron oxide is converted to iron. This swelling characteristic weakens the cement matrix bond, adversely affecting the strength of the agglomerate.

Physical and metallurgical testing of laboratory produced revert briquette agglomerates using the cement/bentonite binder showed acceptable cold strength and significant improvements in high-temperature reduction strength. The improvement in high-temperature reduction strength is related to the little or no swelling observed at high reduction levels. Therefore, there is no adverse effect to the cement matrix bond. Also, no significant swelling was identified when iron content in the briquette was increased by the addition of iron ore and pellet fines.

This invention, by improving high-temperature reduction strength, allows a revert agglomerate to be recycled as a larger portion of the iron-bearing blast-furnace burden (within chemistry limitations) thereby utilizing iron, flux and manganese units and decreasing the volume of revert material to landfill.

Briquette physical strength, or cold strength, is determined by tumbling a sample in a test drum using the conditions specified by the International Organization for Standardization (ISO). The tumbler strength is reported as the amount of material remaining on a 6.3 mm sieve after screening. Higher values are more desirable.

Reduction strength, or hot strength, is determined in the USS 1040° C. simulated blast-furnace (SBF) test. In this test a sample is subjected to simulated blast-furnace conditions (elevated temperatures and reducing conditions), followed by mechanical screening or tumbling. The reduction-strength index is reported as the amount of material remaining on a 6.3 mm sieve after screening. Higher values are more desirable.

Swelling is determined in either the 1040° C. SBF test or in the free-swelling test specified by the ISO. In these tests, a sample is subjected to reducing conditions at elevated temperatures. The swelling index is reported as the percentage increase in sample volume after testing. Lower values are more desirable.

We have found that the volume change (swelling index) of briquettes produced from iron-base particulates, such as steel plant finishing mill scale, is substantially reduced when a binder comprising Portland cement and bentonite is used as compared to that for briquettes made with a binder of Portland cement and calcium-aluminate cement. Set forth in Table 2 below are laboratory test results showing the ISO swelling index for briquettes produced from finishing mill scale and the aforementioned binders.

TABLE 2

VOLUME CHANGE (SWELLING) OF REVERT BRIQUETTES WITH VARIOUS CEMENTITIOUS BINDERS

|  | Test 1 | Test 2 |
|---|---|---|
| Briquette composition, wt. percent |  |  |
| Finishing Mill Scale | 90 | 90 |
| Binder | 10 | 10 |
| Binder proportions, wt percent |  |  |
| Portland Cement | 90 | 75 |
| Calcium-Aluminate Cement | 10 | 0 |
| Bentonite |  | 25 |
| Volume Change (ISO Swelling Index) % | 103 | 4 |

From the observed relationship between an improvement in high-temperature reduction strength and reduced swelling at high reduction levels on bench and pilot tests as set forth hereinbelow, the invention in its broadest aspect includes the following ranges of materials:

| Material | Composition Percent by Weight |
|---|---|
| Binder* | 10 Min. |
| Iron-base particulates** | 90 Max. |

*where the binder comprises 75 to 85 percent by weight of a cement component selected from the group consisting of Portland cement, granulated blast furnace slag cement or mixtures thereof and 15 to 25 percent by weight bentonite.
**where the iron-base particulates comprise finishing mill roll scale, iron ore fines, iron pellet fines or other particulates containing iron of at least 50 percent by weight.

Pellet-fines or iron ore-fines are fragments or dust that is generated through the handling and transportation of the pellets or iron ore. Typically the pellets and iron ore are screened prior to use in the blast furnace. The material that passes a ¼-inch screen is considered fines and is removed to improve the permeability of the blast furnace therefor, improving productivity. These fines consist of mainly iron.

Mill-scale is oxidized steel fragments from the casting and rolling finishing operation. These fines consist of mainly iron.

The above listed materials may or may not be the only materials in the briquette. For example, the briquette may include steel-making slag, blast furnace flue dust, carbonaceous particulates such as coke breeze and other materials.

Table 3 lists the high temperature properties of revert agglomerates produced on a bench scale level using the indicated binders and using an otherwise common compact composition.

TABLE 3

HIGH TEMPERATURE PROPERTIES OF REVERT COMPACTS WITH VARIOUS CEMENTICIOUS BINDERS

|  | Test 1 | Test 2 | Test 3 |
|---|---|---|---|
| Compact composition, percent: |  |  |  |
| Finishing Mill Scale | 29.7 | 29.7 | 29.7 |
| Steelmaking Slag | 30.6 | 30.6 | 30.6 |
| Blast-Furnace Flue Dust | 29.7 | 29.7 | 29.7 |
| Binder | 10.0 | 10.0 | 10.0 |
| Binder proportions: |  |  |  |
| Portland Cement | 100 | 90 | 75 |
| Calcium-aluminate Cement | 0 | 10 | 0 |
| Bentonite | 0 | 0 | 25 |
| High Temperature Reduction Strength, 1040° C. |  |  |  |
| Simulated Blast-Furnace Test: |  |  |  |
| + 6.3 mm (¼ in.), % | 42 | 45 | 60 |
| Volume Change (Swelling), % | +12 | +18 | +8 |

The 1040° C. SBF hot-strength index advantageously increased when bentonite was added to Portland cement as compared to values obtained when the binder consisted of Portland cement alone or a mixture of Portland and calcium-aluminate cements. Also, the use of bentonite as a portion of the binder advantageously decreased the swelling index as determined in both the SBF and ISO free-swelling tests.

Suitable ranges of materials for preparing a briquette of the type tested in Table 3 are as follows:

|  | Composition Percent By Weight |
|---|---|
| Finishing Mill Scale | 20 to 50 |
| Steelmaking Slag | 10 to 30 |
| Blast-furnace Flue Dust | 10 to 40 |
| Binder | 10 to 15 |

Blast furnace flue-dust consists of typically minus-⅛ inch particles and dust from iron ore, pellets, coke, etc. that are generated after screening through handling to the blast furnace. These particles and dust are blown out of the furnace and collected in the waste gas dust collection system. These fines consist of mainly iron, carbon, and slag components.

Steel-making slag is a ceramic type material that when in the molten state is used to purify and minimize the oxidation of the liquid steel. After the furnace is tapped, the slag is water cooled and solidified, then crushed and screened. The coarser (plus ¼-inch) fraction can be recycled to the blast furnace. The minus ¼ inch screened fines when agglomerated can also be recycled to the blast furnace. However, the chemical composition of these slags controls the amount that can be recycled.

The listed materials may or may not be the only materials in the briquette.

Table 4 lists the cold-strength index and high temperature properties of revert briquettes produced in a pilot 12 inch diameter roll briquetting press.

TABLE 4

|  | Composition Percent by Weight | | |
|---|---|---|---|
|  | Test 1 | Test 2 | Test 3 |
| Compact composition, percent: |  |  |  |
| Iron Ore Pellet Fines | 18.9 | 18.9 | 18.9 |
| Finishing Mill Scale | 23.4 | 23.4 | 23.4 |
| Steelmaking Slag | 24.3 | 24.3 | 24.3 |
| Blast-Furnace Flue Dust | 23.4 | 23.4 | 23.4 |

TABLE 4-continued

| | Composition Percent by Weight | | |
|---|---|---|---|
| | Test 1 | Test 2 | Test 3 |
| Binder | 10.0 | 10.0 | 10.0 |
| Binder proportions: | | | |
| Portland Cement | 90 | 75 | 0 |
| Granulated Blast Furnace Slag Cement | 0 | 0 | 75 |
| Calcium-Aluminate Cement | 10 | 0 | 0 |
| Bentonite | 0 | 25 | 25 |
| ISO Tumbler Test Cold Strength Index: | | | |
| + 6.3 mm (¼ in.), % | 67 | 76 | 72 |
| High Temperature Reduction Strength, 1040° C. Simulated Blast-Furnace Test: | | | |
| + 6.3 mm (¼ inc.), % | 86 | 91 | 89 |
| − 0.50 mm, % | 8 | 7 | 9 |
| Volume Change (Swelling), % | +15 | +4 | +8 |

In the tests of Table 4, iron ore pellet fines were included in the revert mix. A binder of Portland cement with a calcium-aluminate cement additive was used as a base case. The cold-strength index advantageously increased when a mixture of Portland cement or granulated blast furnace slag cement and bentonite was used as the binder. Also, high-temperature properties improved when the Portland cement or granulated blast furnace slag cement with bentonite was used as a binder. The hot-strength index increased while the SBF and ISO free-swelling indexes advantageously decreased.

Suitable ranges of materials for a briquette of the type tested in Table 4 are as follows:

| | Composition Percent By Weight |
|---|---|
| Pellet Fines | 10 to 25 |
| Finishing Mill Scale | 20 to 50 |
| Steelmaking Slag | 10 to 30 |
| Blast-Furnace Flue Dust | 10 to 40 |
| Binder | 10 to 15 |

Following are suitable ranges of materials in the binder component of the briquette compositions of Tables 2, 3 and 4.

| | Binder Composition Percent By Weight |
|---|---|
| Portland Cement, granulated blast furnace slag cement or mixtures thereof | 75 to 85 |
| Bentonite | 15 to 25 |

The listed materials may or may not be the only materials in the briquette.

Following are details for performing the cold strength Industrial Organization for Standardization (ISO) test.

TEST PROCEDURE

ISO Cold Tumbler Strength Procedure No. 3271 uses a tumbler apparatus 1000 mm in diameter by 500mm wide fitted with two internal lifters 50 mm×50 mm×5 mm spaced 180° apart.

The strength test uses a 15 kg sample tumbled at 24 rpm for a total of 200 revolutions. After tumbling the sample is screened to determine size consist. Cold strength or the degradation index is based on the cumulative weight percent of the sample remaining on the 6.3 mm sieve after testing.

Following are details for performing the USS 1040° C. simulated blast-furnace (SBF) test.

TEST PROCEDURE

The 1040° C. Simulated-Blast-Furnace (SBF) test was developed by USS to measure high temperature properties of iron bearing furnace feed materials. The test typically uses materials of a particle size of −12.5 by 10.mm. To facilitate testing of larger size revert agglomerates the SBF test uses two modified versions as follows:

| | A | B |
|---|---|---|
| Apparatus | | |
| Type | Vertical Tube | Vertical Tube |
| Diameter, mm | 50 | 127 |
| Sample | | |
| Mass, g | 500 | 1200 |
| Size Consist, mm | −25.0 + 19.0 | 75 mm, Maximum |
| Temperature Profile | | |
| °C./min to 700° C. | 15 | 15 |
| °C./min to 870° C. | 1.4 | 1.4 |
| °C./min to 1040° C. | 1.4 | 1.4 |
| Gas Composition And Flow Rate | To 700° C. 7Nl/min | 28.3Nl/min |
| $N_2$ | 60 | 60 |
| CO | 25 | 25 |
| $CO_2$ | 15 | 15 |
| | To 870° C. 7Nl/min | 28.3Nl/min |
| $N_2$ | 60 | 60 |
| CO | 30 | 30 |
| $CO_2$ | 10 | 10 |
| | To 1040° C. 7Nl/min | 28.3Nl/min |
| $N_2$ | 60 | 60 |
| CO | 35 | 35 |
| $CO_2$ | 5 | 5 |
| Test Results | | |
| Reduction, % | Chemical Analysis | Chemical Analysis |
| Swelling, % | $\left[\frac{V_1}{V_2 - V_1}\right]$* | $\left[\frac{V_1}{V_2 - V_1}\right]$* |
| Reduction Strength Equipment | Ro-Tap 15 minutes | 305 mm Diameter Tumbler 30 RPM for 5 minutes |
| Strength Index, % | +6.3 mm | +6.3 mm |

*Where:
$V_1$ = Volume before testing
$V_2$ = Volume after testing

The following example illustrates a method for forming a briquette of this invention.

EXAMPLE

Portland cement, granulated blast furnace slag cement or mixtures thereof and bentonite are mixed in a first Muller type mixer. The Portland cement/bentonite mix is charged together with revert material such as finishing mill scale, steelmaking slag and blast furnace flue dust with water addition to a second Muller type mixer. The product of the second mixer is charged to a rotary briquetting press or to block forming equipment. The briquette is then stockpiled to allow the binder to cure.

We claim:

1. A revert briquette for an iron-making blast furnace, said briquette comprising a maximum of 90 percent by weight of an iron-base particulate material, said iron-base particulate material being selected from the group consisting of finishing mill scale, iron-ore fines, iron pellet fines and mixtures thereof, and at least 10 percent by weight of a binder, said binder comprising 75 percent to 85 percent by weight of a cement component, said cement component being selected from the group consisting of Portland cement, granulated blast furnace slag cement and mixtures thereof, and 15 percent to 25 percent by weight bentonite, said bentonite improving the cold and hot strength of said briquette.

2. The briquette of claim 1 further comprising 10 percent to 30 percent by weight granulated steel-making slag.

3. The briquette of claim 1 further comprising 10 percent to 40 percent by weight blast furnace flue dust.

4. A revert briquette for an iron-making blast furnace, said briquette comprising 20 to 50 percent by weight of finishing mill scale, and including at least 10 percent by weight of each of the components steel-making slag, blast furnace flue dust and a binder, said binder comprising a maximum of 15 percent by weight of said revert briquette and having 75 percent to 85 percent by weight Portland cement and 15 percent to 25 percent by weight bentonite, said bentonite improving and cold and hot strength of said briquette.

5. A revert briquette for an iron-making blast furnace, said briquette comprising at least 10 percent by weight of iron ore pellet fines, 20 to 50 percent by weight of finishing mill scale, and including at least 10 percent by weight of each of the components steel-making slag, blast furnace flue dust and a binder, said binder comprising a maximum of 15 percent by weight of said revert briquette and having 75 percent to 85 percent by weight Portland cement and 15 percent to 25 percent by weight bentonite, said bentonite improving the cold and hot strength of said briquette.

6. The briquette of claim 4 wherein the steel-making slag comprises 10 to 30 weight percent of said briquette.

7. The briquette of claim 4 wherein the blast furnace flue dust comprises 10 to 40 weight percent of said briquette.

8. The briquette of claim 5 wherein said iron ore pellet fines comprises 10 to 25 weight percent of said briquette.

9. The briquette of claim 5 wherein said steel-making slag comprises 10 to 30 weight percent of said briquette.

10. The briquette of claim 5 wherein said blast furnace flue dust comprises 10 to 40 weight percent of said briquette.

11. A revert briquette for an iron-making blast furnace, said briquette comprising 20 to 50 weight percent finishing mill scale, 10 to 30 weight percent steel-making slag, 10 to 40 weight percent blast furnace flue dust, and 10 to 15 weight percent binder, said binder comprising 75 to 85 weight percent Portland cement and 15 to 25 weight percent bentonite, said bentonite improving the cold and hot strength of said briquette.

12. A revert briquette for an iron-making blast furnace, said briquette comprising 10 to 25 weight percent iron ore pellet fines, 20 to 50 weight percent finishing mill scale, 10 to 30 weight percent steel-making slag, 10 to 40 weight percent blast furnace flue dust, and 10 to 15 weight percent binder, said binder comprising 75 to 85 weight percent Portland cement and 15 to 25 weight percent bentonite, said bentonite improving the cold and hot strength of said briquette.

* * * * *